(12) United States Patent
Watanabe et al.

(10) Patent No.: US 12,436,097 B2
(45) Date of Patent: Oct. 7, 2025

(54) SPECTROSCOPIC MEASUREMENT DEVICE

(71) Applicant: Hitachi High-Tech Corporation, Tokyo (JP)

(72) Inventors: Masahiro Watanabe, Tokyo (JP); Kaifeng Zhang, Tokyo (JP); Shuichi Baba, Tokyo (JP); Takenori Hirose, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 171 days.

(21) Appl. No.: 18/270,880

(22) PCT Filed: Nov. 2, 2021

(86) PCT No.: PCT/JP2021/040468
§ 371 (c)(1),
(2) Date: Jul. 5, 2023

(87) PCT Pub. No.: WO2022/185615
PCT Pub. Date: Sep. 9, 2022

(65) Prior Publication Data
US 2024/0060880 A1 Feb. 22, 2024

(30) Foreign Application Priority Data
Mar. 3, 2021 (JP) .................. 2021-033537

(51) Int. Cl.
*G01N 21/35* (2014.01)
*G02B 21/06* (2006.01)
*G02B 21/26* (2006.01)

(52) U.S. Cl.
CPC ............. *G01N 21/35* (2013.01); *G02B 21/06* (2013.01); *G02B 21/26* (2013.01); *G01N 2201/0636* (2013.01); *G01N 2201/105* (2013.01)

(58) Field of Classification Search
CPC ........... G01N 21/35; G01N 2201/0636; G01N 2201/105; G01N 25/16; G02B 21/06; G02B 21/26; G02B 21/36
See application file for complete search history.

(56) References Cited

U.S. PATENT DOCUMENTS 5,285,260 A    2/1994  Dumoulin
5,959,735 A *  9/1999  Maris ................. G01N 29/2418
                                                   356/432

(Continued)

FOREIGN PATENT DOCUMENTS

JP    06-094602 A    4/1994
JP    2020-041831 A  3/2020

(Continued)

OTHER PUBLICATIONS

International Search Report of PCT/JP2021/040468 dated Jan. 11, 2022.

(Continued)

*Primary Examiner* — Kiho Kim
(74) *Attorney, Agent, or Firm* — Mattingly & Malur, PC

(57) ABSTRACT

Provided is a spectroscopic measurement device capable of improving detection sensitivity to a change in a physical property value such as expansion of a sample to which energy is applied by an infrared ray or the like. The spectroscopic measurement device includes: a stage on which a sample is to be placed; an energy source configured to generate an energy beam to be emitted to a predetermined region of the sample; an electromagnetic wave source configured to generate an electromagnetic wave to be emitted to the sample; an objective lens configured to focus the electromagnetic wave in the predetermined region; two confocal detectors configured to detect the electromagnetic wave reflected by the sample; and a calculation unit configured to calculate, based on each of outputs of the confocal detectors, (Continued)

a change in a physical property value of the sample when the energy beam is emitted to the predetermined region.

11 Claims, 6 Drawing Sheets

(56) References Cited

U.S. PATENT DOCUMENTS

| | | | |
|---|---|---|---|
| 7,751,046 B2 * | 7/2010 | Levy | G01N 21/27 |
| | | | 356/636 |
| 2011/0267613 A1 | 11/2011 | Seiko et al. | |
| 2017/0261375 A1 | 9/2017 | Suzuki et al. | |
| 2022/0179185 A1 | 6/2022 | Yamashita et al. | |

FOREIGN PATENT DOCUMENTS

| | | |
|---|---|---|
| TW | 201213791 A | 4/2012 |
| TW | 201621284 A | 6/2016 |
| WO | 2013/078471 A1 | 5/2013 |
| WO | 2019/204140 A1 | 10/2019 |
| WO | 2020/196784 A1 | 10/2020 |

OTHER PUBLICATIONS

Taiwanese Office Action issued on Mar. 7, 2023 corresponds to Taiwanese Application No. 111105548.

\* cited by examiner

[FIG. 1]
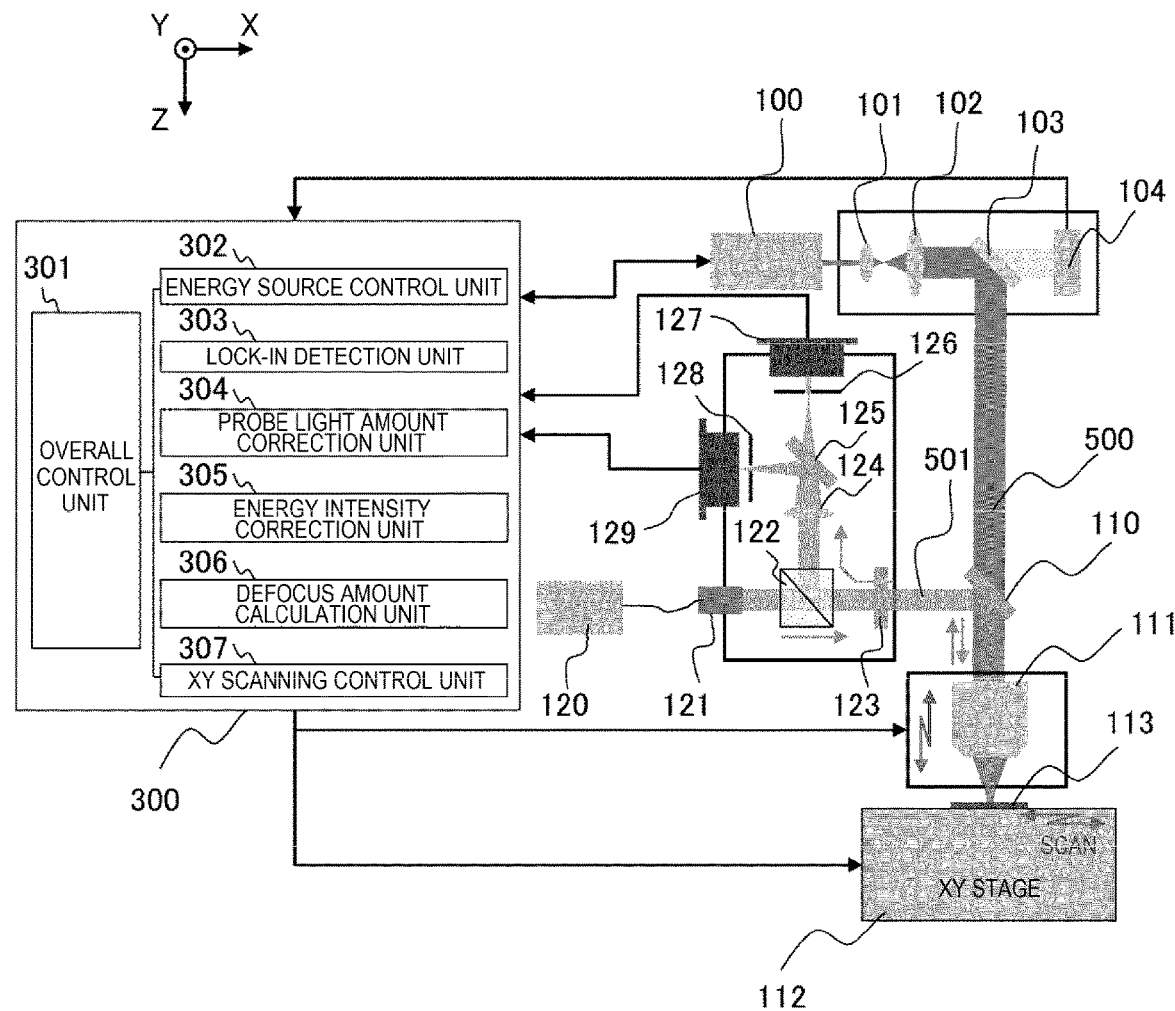

[FIG. 2]
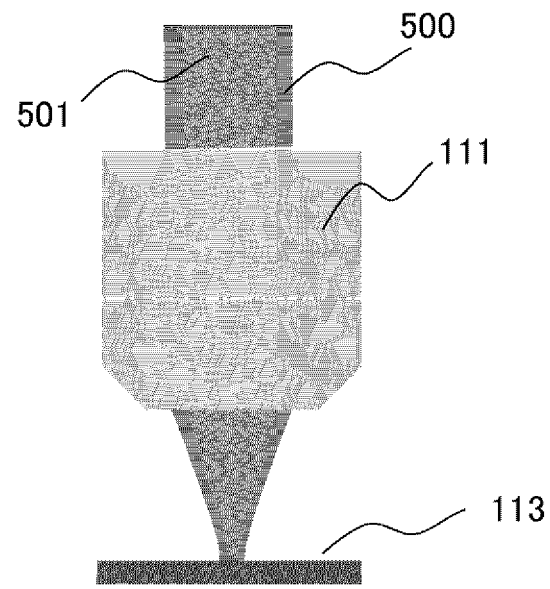
[FIG. 3A]
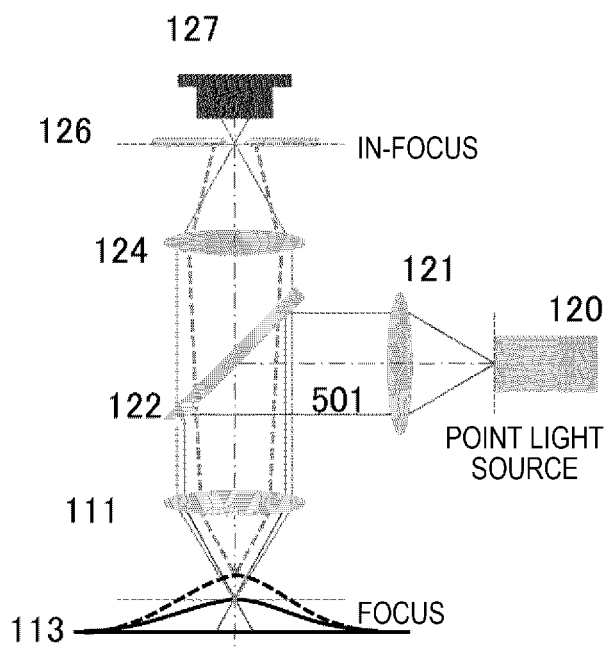

[FIG. 3B]
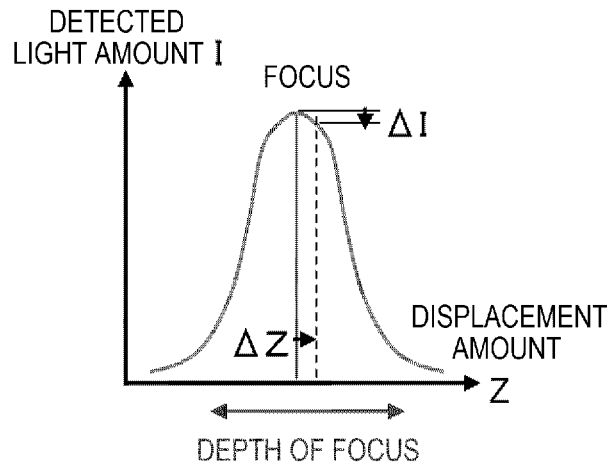
[FIG. 4A]
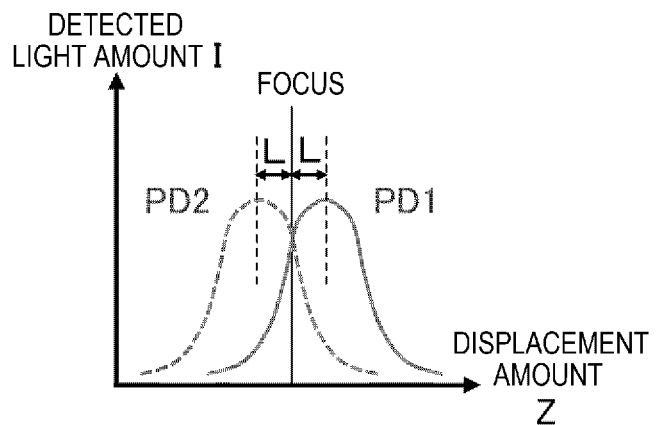
[FIG. 4B]
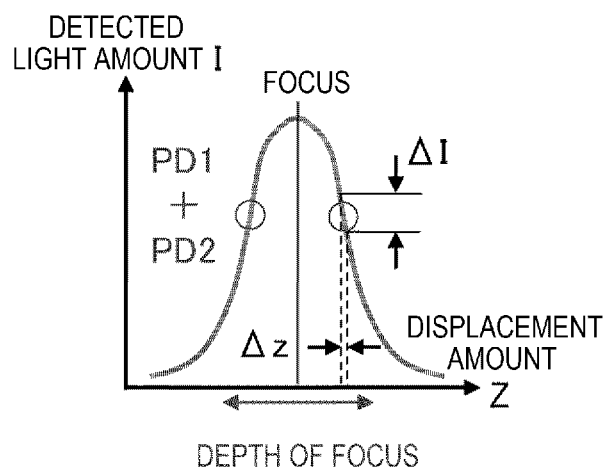

[FIG. 4C]
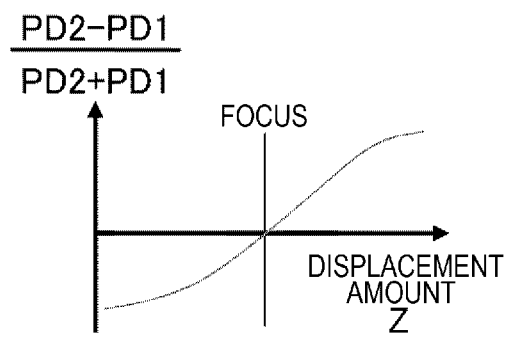
[FIG. 5A]
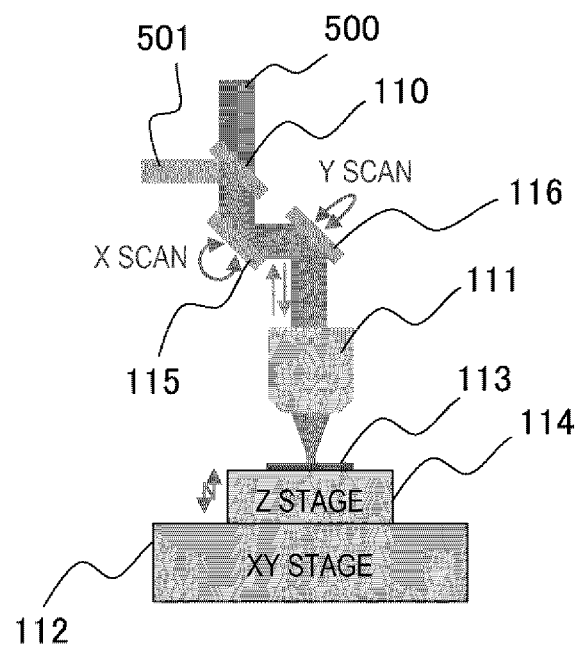

[FIG. 5B]
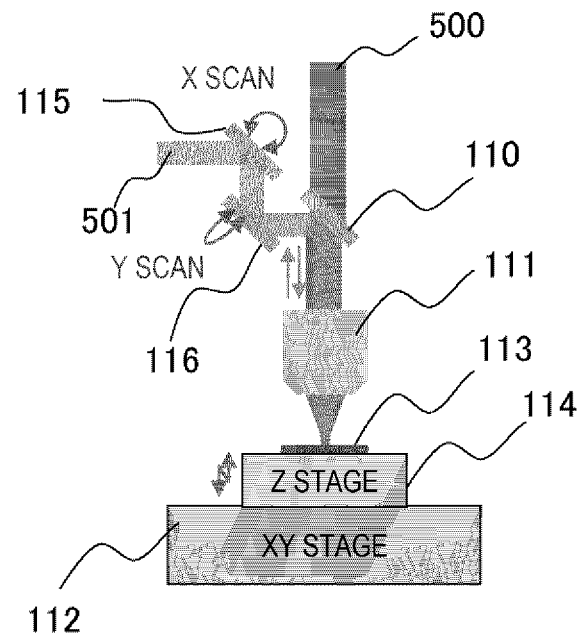
[FIG. 6]
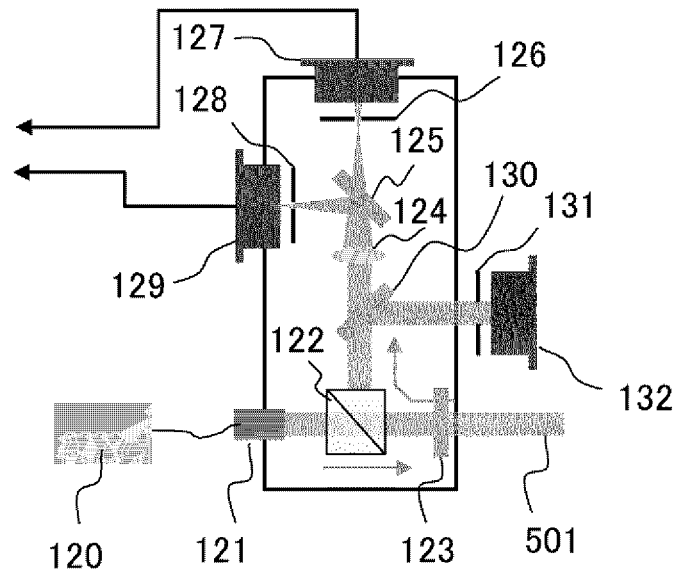

[FIG. 7A]
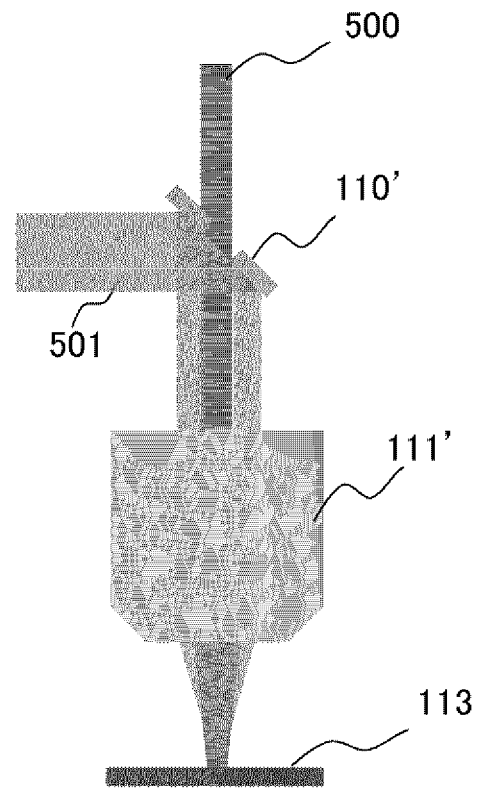
[FIG. 7B]
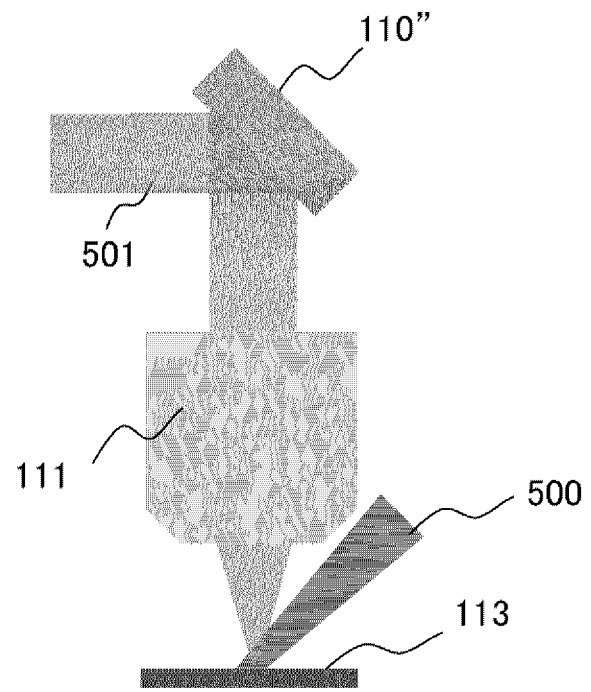

SPECTROSCOPIC MEASUREMENT DEVICE

TECHNICAL FIELD

The present invention relates to a spectroscopic measurement device.

BACKGROUND ART

A spectroscopic measurement device is a device that analyzes a composition of a substance and identifies a foreign substance mixed in the substance by measuring an absorption curve specific to the substance with respect to a wavelength of light, that is, an absorption spectrum. Since an infrared ray having a wavelength of about 10 times a wavelength of visible light is generally used for analysis of molecular vibration or the like, a spatial resolution limited by a diffraction limit proportional to a wavelength of used light remains to an order of 10 μm.

PTL 1 discloses that, in order to analyze a sample in a non-contact and non-destructive manner without pretreatment, expansion and contraction of a sample periodically photothermally heated by an infrared laser are measured by a confocal detector using a visible light laser. In the measurement using the visible light laser, the spatial resolution can be 1 μm or less.

CITATION LIST

Patent Literature

PTL 1: WO2013/078471

SUMMARY OF INVENTION

Technical Problem

However, in PTL 1, since a single confocal detector is used, a change in a detected light amount of the confocal detector is small when a surface of a sample is displaced from an in-focus position, and a detection sensitivity to the displacement of the surface is low.

Accordingly, an object of the invention is to provide a spectroscopic measurement device capable of improving the detection sensitivity to a change in a physical property value such as expansion of a sample to which energy is applied by an infrared ray or the like.

Solution to Problem

In order to achieve the above object, the invention provides a spectroscopic measurement device, which includes: a stage on which a sample is to be placed; an energy source configured to generate an energy beam to be emitted to a predetermined region of the sample; an electromagnetic wave source configured to generate an electromagnetic wave to be emitted to the sample; an objective lens configured to focus the electromagnetic wave in the predetermined region; two confocal detectors configured to detect the electromagnetic wave reflected by the sample; and a calculation unit configured to calculate, based on each of outputs of the confocal detectors, a change in a physical property value of the sample when the energy beam is emitted to the predetermined region.

Advantageous Effects of Invention

According to the invention, it is possible to provide the spectroscopic measurement device capable of improving a detection sensitivity to a change in a physical property value such as expansion of a sample to which energy is applied by an infrared ray or the like.

BRIEF DESCRIPTION OF DRAWINGS

FIG. 1 is a schematic configuration diagram of an example of a spectroscopic measurement device according to Embodiment 1.

FIG. 2 is a diagram illustrating an energy beam and a probe light with which a sample is irradiated.

FIG. 3A is a diagram illustrating a configuration of a confocal detector.

FIG. 3B is a diagram illustrating a relationship between a detected light amount of the confocal detector and a displacement amount.

FIG. 4A is a diagram illustrating relationships between detected light amounts of two confocal detectors and the displacement amount.

FIG. 4B is a diagram illustrating a relationship between a sum of the detected light amounts of the two confocal detectors and the displacement amount.

FIG. 4C is a diagram illustrating a relationship between a ratio of a difference between the detected light amounts of the two confocal detectors to the sum of the detected light amounts of the two confocal detectors and the displacement amount.

FIG. 5A is a diagram illustrating an example of XY scanning of a spectroscopic measurement device according to Embodiment 2.

FIG. 5B is a diagram illustrating another example of the XY scanning of the spectroscopic measurement device according to Embodiment 2.

FIG. 6 is a diagram illustrating an example of a confocal detector of a spectroscopic measurement device according to Embodiment 3.

FIG. 7A is a diagram illustrating an example of irradiation of an energy beam of a spectroscopic measurement device according to Embodiment 4.

FIG. 7B is a diagram illustrating another example of the irradiation of the energy beam of the spectroscopic measurement device according to Embodiment 4.

DESCRIPTION OF EMBODIMENTS

Hereinafter, embodiments of a spectroscopic measurement device of the invention will be described with reference to the drawings.

Embodiment 1

An overall configuration of a spectroscopic measurement device of Embodiment 1 will be described with reference to FIG. 1. In FIG. 1, a vertical direction is defined as a Z direction, and horizontal directions are defined as an X direction and a Y direction. The spectroscopic measurement device includes a stage mechanism system on which a sample 113 is placed, an energy application system that applies energy to the sample 113, a measurement system that measures a physical property value of the sample 113, and a control system that processes data output from each unit and controls each unit.

The stage mechanism system is provided with the sample 113 and includes an XY stage 112 which moves in the X direction and the Y direction. Any region of a surface of the sample 113 is analyzed as the XY stage 112 moves in the X direction and the Y direction.

The energy application system includes an energy source 100, beam expander lenses 101 and 102, a partial reflection mirror 103, an energy detector 104, a dichroic mirror 110, and an objective lens 111. The dichroic mirror 110 and the objective lens 111 are shared with the measurement system.

The energy source 100 generates an energy beam 500 that applies energy to the sample 113, for example, an infrared ray beam. The energy beam 500 is expanded in a beam diameter by the beam expander lenses 101 and 102, and then travels toward the partial reflection mirror 103. The partial reflection mirror 103 transmits a part of the energy beam 500 toward the energy detector 104, and reflects a remaining part toward the sample 113. The energy detector 104 measures an intensity of the energy beam 500 transmitted through the partial reflection mirror 103. The energy beam 500 reflected by the partial reflection mirror 103 is transmitted through the dichroic mirror 110, is focused by the objective lens 111, and then is emitted to the sample 113. The sample 113 irradiated with the energy beam 500 absorbs the applied energy and causes thermal expansion.

The measurement system includes a light source 120, a collimator lens 121, a beam splitter 122, a filter 123, a condensing lens 124, a half mirror 125, pinholes 126 and 128, photodetectors 127 and 129, the dichroic mirror 110, and the objective lens 111.

The light source 120 generates probe light 501 for measuring the physical property value of the sample 113, for example, a visible light beam or an ultraviolet radiation beam which is an electromagnetic wave. It is desirable that the probe light 501 generated by the light source 120 is a beam having a wavelength shorter than a wavelength of the energy beam 500 and condensed to a spot smaller than a spot of the energy beam 500, for example, a beam of green light or blue light. The probe light 501 becomes a substantially parallel beam due to the collimator lens 121, and then is transmitted through the beam splitter 122 and the filter 123 to travel toward the dichroic mirror 110. The dichroic mirror 110 reflects the probe light 501 toward the objective lens 111. The probe light 501 reflected by the dichroic mirror 110 is focused by the objective lens 111, and then is emitted to the sample 113.

The energy beam 500 and the probe light 501 emitted to the sample 113 will be described with reference to FIG. 2. As described above, both the energy beam 500 and the probe light 501 are focused by the objective lens 111 and emitted to the sample 113. The probe light 501 has a beam diameter smaller than that of the energy beam 500, and is emitted to a region narrower than that of a region to which the energy beam 500 is emitted. Therefore, a physical property value of the region to which the energy beam 500 is emitted can be measured by using a high spatial resolution. In particular, when the probe light 501 is a visible light beam, the beam diameter of the probe light 501 condensed to the surface of the sample 113 is about 0.5 μm. Further, since the confocal detector is used in the measurement system, a spatial resolution of the measurement system is about 0.3 μm. The measured physical property value includes a change in displacement and a curvature of the surface, a change in a surface reflectance, and the like, of the sample 113 which expands due to absorption of the energy beam 500.

The confocal detector will be described with reference to FIGS. 3A and 3B. The confocal detector is configured such that when light emitted from a point light source is focused on a surface of a sample, light reflected from the sample is focused on a detection surface. Specifically, the light source 120, the collimator lens 121, the beam splitter 122, the objective lens 111, the sample 113, the condensing lens 124, the pinhole 126, and the photodetector 127 are arranged as illustrated in FIG. 3A. The probe light 501 generated by a point light source of the light source 120 becomes a parallel beam due to the collimator lens 121, and then is reflected by the beam splitter 122 to enter the objective lens 111. The objective lens 111 focuses the probe light 501 to bring it into focus.

When a focal point is on the surface of the sample 113, the reflected probe light 501 passes through the objective lens 111, the beam splitter 122, and the condensing lens 124 along an optical path indicated by a solid line in FIG. 3A, and is focused on the pinhole 126. As a result, most of the probe light 501 reflected by the sample 113 passes through the pinhole 126 and is detected by the photodetector 127. When the sample 113 expands due to irradiation of the energy beam 500 and the surface is displaced as indicated by a dotted line in FIG. 3A, the probe light 501 travels along an optical path of a dotted line and is not focused on the pinhole 126. As a result, an amount of light passing through the pinhole 126 and detected by the photodetector 127 is smaller than that in a case of the optical path indicated by the solid line. That is, a detected light amount of the photodetector 127 changes according to a displacement amount of the surface of the sample 113, and therefore, a change in the physical property value of the sample 113 to which energy is applied can be measured by the photodetector 127.

FIG. 3B is a graph illustrating a relationship between a detected light amount I of the confocal detector and a displacement amount Z of the sample 113. As shown in FIG. 3B, the detected light amount I becomes maximum when the surface of the sample 113 is at an in-focus position, and decreases as the surface deviates from the in-focus position. Further, a detection sensitivity of the displacement amount, which is an absolute value of a ratio $\Delta I/\Delta Z$ between a change amount $\Delta I$ of the detected light amount I and a change amount $\Delta Z$ of the displacement amount Z, is minimum at the in-focus position, and is substantially zero near the in-focus position. In Embodiment 1, the detection sensitivity is improved by using two confocal detectors.

Returning to FIG. 1, description of the measurement system will be continued. The probe light 501 emitted to the sample 113 is reflected by the surface of the sample 113, returns to the beam splitter 122 along an original optical path, and is reflected toward the condensing lens 124. The probe light 501 incident on the condensing lens 124 is focused to travel to the half mirror 125. In the half mirror 125, substantially half of the focused probe light 501 is transmitted toward the pinhole 126, and remaining substantially half is reflected toward the pinhole 128. Among the probe light 501 transmitted through the half mirror 125, the probe light 501 passing through the pinhole 126 is detected by the photodetector 127. Further, among the probe light 501 reflected by the half mirror 125, the probe light 501 passing through the pinhole 128 is detected by the photodetector 129. The pinhole 126 and the pinhole 128 are arranged away from a focal position of the condensing lens 124. That is, the pinhole 126 is arranged away from the focal position of the condensing lens 124 by a distance L in a direction away from the sample 113, and the pinhole 128 is arranged away from the focal position by a distance L in a direction toward the sample 113. The distance L is set to be equal to or less than a depth of focus.

FIG. 4A is a graph illustrating relationships between the detected light amounts of the photodetector 127 and the photodetector 129 and the displacement amount of the sample 113 when each of the pinhole 126 and the pinhole 128 is arranged away from the focal position by the distance L. A peak of a detected light amount curve PD1 of the photodetector 127 and a peak of a detected light amount curve PD2 of the photodetector 129 deviate from the in-focus position by the distance L.

FIG. 4B is a graph obtained by adding the detected light amount curves PD1 and PD2. By using the graph illustrated in FIG. 4B, the displacement amount can be measured at a position where the detection sensitivity of the displacement amount which is the absolute value of ΔI/ΔZ is high, for example, a position indicated by circles in FIG. 4B. That is, the detection sensitivity of the displacement amount can be improved.

FIG. 4C is a graph obtained by calculation using a following expression.

(PD2−PD1)/(PD2+PD1)  (Expression 1)

A value calculated using (Expression 1) substantially linearly changes with respect to the displacement amount Z, and becomes zero at the in-focus position. That is, the use of the graph illustrated in FIG. 4C facilitates control for adjusting the focal position. For example, by controlling a position of the sample 113 in the Z direction so that the value of (Expression 1) becomes zero, it is possible to absorb deviation of the focal position due to drift or the like of a distance between the objective lens 111 and the sample 113. Further, it is possible to perform measurement while making the focal position follow unevenness of the surface of the sample 113.

The value used for controlling the focal position may be PD2−PD1. When PD2−PD1 is used, division of (Expression 1) is eliminated and a calculation amount can be reduced, thereby reducing processing time. Further, if (Expression 1) is used, PD2+PD1 is normalized, so even when a reflectance or a refractive index of the surface of the sample 113 is not uniform or an intensity of the light source 120 varies, influences of the above cases can be reduced.

Here, the beam splitter 122 will be described. When the transmission and the reflection in the beam splitter 122 are approximately one-to-one, an amount of the probe light 501 passing through the beam splitter 122 twice is reduced to a factor of four. In order to prevent a decrease of the amount of the probe light 501, a polarization beam splitter may be used as the beam splitter 122.

When a polarization beam splitter is used, if light emitted from the collimator lens 121 is polarized in a vertical direction of a paper surface, most of the light is transmitted through the beam splitter 122. If a λ/4 plate whose axial direction is rotated by 45 degrees with respect to a polarization direction is arranged as the filter 123, the probe light 501 emitted from the filter 123 becomes circularly polarized light. The probe light 501, which has become the circularly polarized light, is reflected by the surface of the sample 113, returns to the filter 123 along the original optical path, and is transmitted through the filter 123 which is a λ/4 plate, thereby converting the circularly polarized light into linearly polarized light in a direction perpendicular to the paper surface. Further, almost all of the probe light 501, which has been converted into the linearly polarized light, is reflected toward the condensing lens 124 due to characteristics of the polarization beam splitter. That is, by using the polarization beam splitter as the beam splitter 122 and arranging the λ/4 plate as the filter 123, the probe light 501 can be guided toward the photodetectors 127 and 129 without reducing the amount of the probe light 501.

Further, a wavelength filter that transmits only the wavelength of the probe light 501 may be added as the filter 123. By adding a wavelength filter, detection of light other than the probe light 501 can be prevented, and detection noise can be reduced.

The control system will be described. The control system is a control device 300 including an overall control unit 301, an energy source control unit 302, a lock-in detection unit 303, a probe light amount correction unit 304, an energy intensity correction unit 305, a defocus amount calculation unit 306, and an XY scanning control unit 307. The overall control unit 301 is a calculator that controls each unit and processes and transmits data generated by each unit, and is, for example, a central processing unit (CPU) or a microprocessing unit (MPU). Each unit other than the overall control unit 301 may be implemented by dedicated hardware using an application specific integrated circuit (ASIC), a field-programmable gate array (FPGA), or the like, or may be implemented by software operating on a calculator. A display device, a printer, or a storage device appearing in the above description and the later description may be a part of the control device 300 or an external device.

The energy source control unit 302 controls the wavelength, the intensity, and the like of the energy beam 500 generated by the energy source 100. By scanning the wavelength, an absorption spectrum of the sample 113 can be measured. In addition, since the intensity is modulated, lock-in detection can be performed by the lock-in detection unit 303 to be described later.

The lock-in detection unit 303 performs so-called lock-in detection by detecting the detected light amounts PD1 and PD2 of the photodetectors 127 and 129 in comparison with a modulation signal transmitted from the energy source control unit 302. For example, an amplitude of PD2−PD1 is obtained by the lock-in detection of a signal of PD2−PD1 with reference to the modulation signal.

The lock-in detection may be performed for each of the PD1 and the PD2 with reference to the modulation signal, and then a difference between the PD1 and the PD2 may be calculated, or the lock-in detection may be performed for the value of (Expression 1).

Instead of the lock-in detection, so-called AM detection may be used in which a displacement signal corresponding to a modulation frequency of the energy beam 500 is extracted by a filter, and then an amplitude is measured. Further, a spectrum of the displacement signal may be analyzed using FFT or the like, and an intensity of a spectrum peak corresponding to the modulation frequency may be measured. Further, other general amplitude detection methods may be used.

The probe light amount correction unit 304 divides the amplitude of PD2−PD1, which is obtained by the lock-in detection unit 303, by PD2+PD1. A value obtained by the division is proportional to the amplitude of the displacement of the surface of the sample 113, and is hereinafter referred to as a sample displacement measurement value.

The energy intensity correction unit 305 calculates a value proportional to an energy absorption rate by dividing the sample displacement measurement value, which is obtained by the probe light amount correction unit 304, by the intensity of the energy beam 500 measured by the energy detector 104. The absorption spectrum of the sample 113 is obtained by calculating the value proportional to the energy absorption rate while scanning the wavelength of the energy beam 500. The obtained absorption spectrum may be output to outside in a table form or a graph form. For example, an absorption spectrum in a graph form may be displayed on a display device such as a liquid crystal display, stored in a storage device, or printed by a printer or the like. The defocus amount calculation unit 306 controls a position of the objective lens 111 in the Z direction based on the value of (Expression 1). By controlling the position of the objective lens 111 in the Z direction, the probe light 501 can follow the unevenness of the surface of the sample 113.

The XY scanning control unit 307 moves the objective lens 111 or the XY stage 112 in the X direction and the Y direction. By the movement of the objective lens 111 or the XY stage 112, any position of the sample 113 can be irradiated with the energy beam 500 and the probe light 501, and distribution of the absorption spectrum on the surface of the sample 113 can be measured. In particular, in a state in which the wavelength of the energy beam 500 is fixed, the measurement by the two confocal detectors is performed while moving the objective lens 111 or the XY stage 112, thereby generating a map image of an absorbance to the wavelength.

By operating the defocus amount calculation unit 306 and the XY scanning control unit 307 in cooperation with each other, the lens or the stage can be moved while performing focus tracking of the probe light 501 with respect to the unevenness of the surface of the sample 113. As a result, XY scanning can be performed while maintaining a state in which the detection sensitivity of the energy absorption rate is normally high. Further, the generated map image of the absorbance may be output to the outside as it is or in a graph form. For example, the map image may be displayed on a display device such as a liquid crystal display, stored in a storage device, or printed by a printer or the like. The display in a graph form is, for example, a two-dimensional graph when the XY scanning control unit 307 performs one-dimensional scanning, and is a three-dimensional graph when the XY scanning control unit 307 performs two-dimensional scanning.

As described above, in Embodiment 1, the detection sensitivity can be improved by detecting the change in the physical property value such as the expansion of the sample 113, to which energy is applied by an infrared ray or the like, based on the outputs PD1 and PD2 of the two confocal detectors. Further, by calculating (PD2−PD1)/(PD2+PD1) based on each output, it is possible to reduce influences of the reflectance or the refractive index of the surface of the sample 113, the unevenness of the surface, a light amount variation of the energy beam 500 or the probe light 501, the drift of the distance between the objective lens 111 and the sample 113, and the like. Furthermore, the spatial resolution can be improved by using visible light having a wavelength shorter than that of the infrared ray as the probe light 501.

Further, by using the outputs PD1 and PD2 of the two confocal detectors, autofocusing is also possible in addition to the measurement of the change in the physical property value, and thus a space of the spectroscopic measurement device can be saved without providing a separate autofocus mechanism. In addition, since the focal position can be made to follow the surface of the sample having large unevenness at a high speed by autofocus using the two confocal detectors, time required for the measurement can be shortened.

Embodiment 2

In Embodiment 1, the case of scanning the positions irradiated with the energy beam 500 and the probe light 501 by moving the objective lens 111 in the X direction and the Y direction was described. In Embodiment 2, a case of scanning a position irradiated with the energy beam 500 and the probe light 501 while the objective lens 111 remains fixed will be described. The same components as those of Embodiment 1 are denoted by the same reference numerals, and the descriptions thereof will be omitted.

A main part of Embodiment 2 will be described with reference to FIGS. 5A and 5B. In a spectroscopic measurement device of Embodiment 2, an x-scanning mirror 115, a y-scanning mirror 116, and a Z stage 114 are added to the configuration of Embodiment 1.

The x-scanning mirror 115 and the y-scanning mirror 116 are mirrors that reflect the energy beam 500 and the probe light 501. Scan in the X direction is performed with the energy beam 500 and the probe light 501 due to a rotation of the x-scanning mirror 115, and scan in the Y direction is performed due to a rotation of the y-scanning mirror 116. The rotation of the x-scanning mirror 115 and the rotation of the y-scanning mirror 116 are controlled by the XY scanning control unit 307.

The Z stage 114 is disposed on the XY stage 112, is provided with the sample 113, and moves in the Z direction. The movement of the Z stage 114 in the Z direction is controlled by the defocus amount calculation unit 306. That is, a position of the Z stage 114 in the Z direction is controlled based on the value of (Expression 1), and thus the probe light 501 can follow the unevenness of the surface of the sample 113 as in Embodiment 1.

In FIG. 5A, the x-scanning mirror 115 and the y-scanning mirror 116 are disposed between the dichroic mirror 110 and the objective lens 111, and the surface of the sample 113 is scanned with the energy beam 500 and the probe light 501 by the rotation of both mirrors. By scanning the surface of the sample 113 with the energy beam 500 and the probe light 501, the distribution of the absorption spectrum can be measured as in Embodiment 1.

In FIG. 5B, the x-scanning mirror 115 and the y-scanning mirror 116 are disposed between the filter 123 and the dichroic mirror 110, and the surface of the sample 113 is scanned only with the probe light 501 as both mirrors rotate. That is, in a configuration illustrated in FIG. 5B, even when the x-scanning mirror 115 and the y-scanning mirror 116 rotate, the scan is not performed with the energy beam 500. A region irradiated with the energy beam 500 is scanned with the probe light 501. The distribution of the absorption spectrum in the region irradiated with the energy beam 500 can be measured by scanning the region with the probe light 501.

As described above, in Embodiment 2, the distribution of the absorption spectrum can be measured by scanning the surface of the sample 113 with the probe light 501 at least by the rotation of the x-scanning mirror 115 and the rotation of the y-scanning mirror 116. Further, as in Embodiment 1, the detection sensitivity can be improved by detecting the change in the physical property value such as the expansion of the sample 113, to which energy is applied by an infrared ray or the like, based on the outputs PD1 and PD2 of the two confocal detectors.

Scan may be performed with the probe light 501 and the energy beam 500 not only due to the rotation of the x-scanning mirror 115 and the rotation of the y-scanning mirror 116, but also due to a combination with a movement of the XY stage 112 or the objective lens 111 in the horizontal direction. For example, in the configuration illustrated in FIG. 5B, the surface of the sample 113 may be scanned due to the movement of the objective lens 111 or the like after the probe light 501 is aligned with respect to the region irradiated with the energy beam 500 due to the rotation of the x-scanning mirror 115 and the rotation of the y-scanning mirror 116.

Further, as in Embodiment 1, by using the outputs PD1 and PD2 of the two confocal detectors, autofocusing is also possible in addition to the measurement of the change in the physical property value, and thus a space of the spectroscopic measurement device can be saved without providing a separate autofocus mechanism. In addition, since the focal position can be made to follow the surface of the sample having large unevenness at a high speed by autofocus using the two confocal detectors, time required for the measurement can be shortened.

Embodiment 3

In Embodiment 1, the case of using the two confocal detectors to detect the probe light 501 reflected by the surface of the sample 113 was described. In Embodiment 3, detection by a confocal detector and measurement of a scattering state of the surface of the sample 113 by detecting the probe light 501 before being focused by the condensing lens 124 via an aperture stop will be described. The same components as those of Embodiment 1 are denoted by the same reference numerals, and the descriptions thereof will be omitted.

A main part of Embodiment 3 will be described with reference to FIG. 6. In the spectroscopic measurement device of Embodiment 3, a mirror 130, an aperture stop 131, and a photodetector 132 are added to the configuration of Embodiment 1. The mirror 130 is disposed between the beam splitter 122 and the condensing lens 124, and reflects a part or almost all of the probe light 501 reflected by the surface of the sample 113 toward the aperture stop 131. That is, if the mirror 130 is a partial reflection mirror, a part of the probe light 501 travels toward the aperture stop 131, and if the mirror 130 is a total reflection mirror, almost all of the probe light 501 travels toward the aperture stop 131. The photodetector 132 measures the scattering state of the surface of the sample 113 by detecting the probe light 501 passing through the aperture stop 131.

On the surface of the sample 113 irradiated with the energy beam 500, the curvature locally changes due to the thermal expansion, or the refractive index locally changes due to a change in temperature or a change in a carrier concentration. As a result, an angular distribution of reflected light of the probe light 501 may change as the scattering state of the surface of the sample 113 changes. Due to the change in the angular distribution of the reflected light, a degree of spread of the probe light 501 in the aperture stop 131 changes, and the detected light amount of the photodetector 132 changes. Therefore, the scattering state of the surface of the sample 113 can be measured by detecting the probe light 501 by the photodetector 132 via the aperture stop 131.

When the displacement of the surface of the sample 113 is small and the detection is difficult, the lock-in detection may be performed by using the intensity of the energy beam 500 as a reference signal. Further, when the mirror 130 is a total reflection mirror, measurement may be performed by a confocal detector when the mirror 130 is removed from the optical path of the probe light 501, and the scattering state may be measured when the mirror 130 is inserted into the optical path.

As described above, in Embodiment 3, the scattering state of the surface of the sample 113 can be measured by detecting the probe light 501 before being focused by the condensing lens 124 via the aperture stop 131. The measurement by a confocal detector and the measurement of the scattering state can also be combined.

Embodiment 4

In Embodiment 1, a case of using an infrared ray beam as the energy beam 500 that applies energy to the sample 113 was described. In Embodiment 4, a case of using a charged particle beam such as an electron beam or an ion beam as the energy beam 500 will be described. The same components as those of Embodiment 1 are denoted by the same reference numerals, and the descriptions thereof will be omitted.

A main part of Embodiment 4 will be described with reference to FIGS. 7A and 7B. In the spectroscopic measurement device of Embodiment 4, since a charged particle beam is used as the energy beam 500, the dichroic mirror 110 and the objective lens 111 cannot be shared in the energy application system and the measurement system. In FIG. 7A, in contrast to the configuration of Embodiment 1, the dichroic mirror 110 is replaced with a perforated mirror 110', and the objective lens 111 is replaced with a hollow objective lens 111'.

The perforated mirror 110' is a mirror having a hole at a center portion, and the hollow objective lens 111' is a lens having a hole at a center portion. The energy beam 500, which is a charged particle beam, passes through the hole of the perforated mirror 110' and the hole of the hollow objective lens 111' to emit to the sample 113. Further, the probe light 501 is reflected toward the hollow objective lens 111' at a position other than the hole of the perforated mirror 110', and is focused at a position other than the hole of the hollow objective lens 111' to emit to the sample 113. The energy beam 500, which is a charged particle beam, and the probe light 501 emitted onto the sample 113 are reflected by the sample 113, and then detected by two confocal detectors as in Embodiment 1.

In FIG. 7B, in contrast to the configuration of Embodiment 1, the dichroic mirror 110 is replaced with a mirror 110". The probe light 501 is reflected by the mirror 110", enters the objective lens 111, and is focused to be emitted to the sample 113. The energy beam 500, which is a charged particle beam, is emitted to the sample 113 from outside an axis of the objective lens 111. Also, in the configuration illustrated in FIG. 7B, the energy beam 500, which is a charged particle beam, and the probe light 501 emitted to the sample 113 are reflected by the sample 113, and then detected by two confocal detectors.

As described above, in Embodiment 4, since a charged particle beam is used as the energy beam 500, energy can be applied to a region narrower than that of an infrared ray beam, and the spatial resolution can be further improved.

A plurality of embodiments of the invention were described above. The invention is not limited to these embodiments, and the components may be modified or the embodiments may be appropriately combined without departing from the scope of the invention. Further, several components may be omitted from all the components shown in the above embodiments.

REFERENCE SIGNS LIST

100: energy source
101, 102: beam expander lens
103: partial reflection mirror
104: energy detector
110: dichroic mirror
110': perforated mirror 110": mirror
111: objective lens
111': hollow objective lens
112: XY stage
113: sample
114: Z stage
115: x-scanning mirror
116: y-scanning mirror
120: light source
121: collimator lens
122: beam splitter
123: filter
124: condensing lens
125: half mirror
126, 128: pinhole
127, 129: photodetector
130: mirror
131: aperture stop
132: photodetector
300: control device
301: overall control unit
302: energy source control unit
303: lock-in detection unit
304: probe light amount correction unit
305: energy intensity correction unit
306: defocus amount calculation unit
307: XY scanning control unit
500: energy beam
501: probe light

The invention claimed is:

1. A spectroscopic measurement device, comprising:
a stage on which a sample is to be placed;
an energy source configured to generate an energy beam to be emitted to a predetermined region of the sample;
an electromagnetic wave source configured to generate an electromagnetic wave to be emitted to the sample;
an objective lens configured to focus the electromagnetic wave in the predetermined region;
two confocal detectors configured to detect the electromagnetic wave reflected by the sample; and
a central processing unit (CPU) programmed to calculate, based on each of outputs of the confocal detectors, a change in a physical property value of the sample when the energy beam is emitted to the predetermined region.

2. The spectroscopic measurement device according to claim 1, further comprising:
a Z-direction control unit configured to control a relative distance between the objective lens and the stage based on each of the outputs of the confocal detector.

3. The spectroscopic measurement device according to claim 2,
wherein a first confocal detector has a pinhole arranged away from a focal position by a distance L in a direction away from the sample, and a second confocal detector has a pinhole arranged away from the focal position by the distance L in a direction toward the sample, and
wherein the Z-direction control unit controls the relative distance based on a value of (PD2−PD1)/(PD2+PD1), in which PD1 is an output of the first confocal detector, and PD2 is an output of the second confocal detector.

4. The spectroscopic measurement device according to claim 1, further comprising:
an XY scanning control unit configured to control a position of the predetermined region.

5. The spectroscopic measurement device according to claim 4,
wherein the XY scanning control unit controls the position of the predetermined region by moving the objective lens or the stage in a horizontal direction.

6. The spectroscopic measurement device according to claim 4,
wherein the XY scanning control unit controls the position of the predetermined region by rotating a mirror arranged on a path of the energy beam and configured to reflect the energy beam.

7. The spectroscopic measurement device according to claim 4, further comprising:
a display device configured to display a map image of an absorbance.

8. The spectroscopic measurement device according to claim 1, further comprising:
an XY scanning control unit configured to control a position irradiated with the electromagnetic wave in the predetermined region by rotating a mirror arranged on a path of the electromagnetic wave and configured to reflect the electromagnetic wave.

9. The spectroscopic measurement device according to claim 1, further comprising:
an energy detector configured to measure an intensity of the energy beam,
wherein the CPU is programmed to correct the change in the physical property value based on the intensity of the energy beam.

10. The spectroscopic measurement device according to claim 1,
wherein the energy source modulates an intensity of the energy beam, and
wherein the CPU is programmed to correct the change in the physical property value based on a modulation signal of the intensity of the energy beam.

11. The spectroscopic measurement device according to claim 1, further comprising:
a display device configured to display an absorption spectrum.

* * * * *